United States Patent Office 3,519,643
Patented July 7, 1970

3,519,643
SULFONYLUREA DERIVATIVES
Erhard Schenker, Basel, and Klaus Hasspacher, Riehen, Switzerland, assignors to Sandoz Ltd. (also known as Sandoz A.G.), Basel, Switzerland
No Drawing. Filed May 2, 1967, Ser. No. 635,351
Claims priority, application Switzerland, May 4, 1966, 6,482/66; Jan. 24, 1967, 1,035/67
Int. Cl. C07d 27/30
U.S. Cl. 260—326.3   4 Claims

ABSTRACT OF THE DISCLOSURE

The present invention provides compounds of formula:

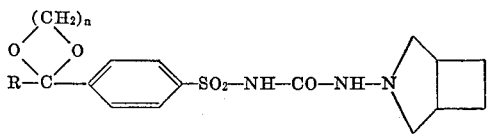

in which R is alkyl of 1 to 3 carbon atoms and $n$ is 2 or 3, and the pharmaceutically acceptable alkali metal, alkaline earth metal and ammonium salts and salts with organic bases thereof. These compounds exhibit a pronounced blood sugar lowering effect, and, upon administration of low doses, they furthermore lower the content of free fatty acids in the blood. The production of these compounds is furthermore described.

---

The present invention relates to new sulphonyl-urea derivatives and a process for their production.

The present invention provides heterocyclic sulphonyl-urea derivatives of Formula I,

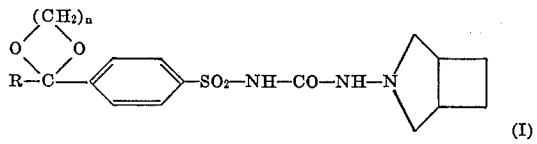

in which R signifies an alkyl radical having 1 to 3 carbon atoms, and $n$ signifies the number 2 or 3, and their pharmaceutically aceptable alkali metal, alkaline earth metal and ammonium salts and salts with organic bases.

The present invention further provides the following three processes for the production of compounds of Formul I, and their alkali metal, alkaline earth metal and ammonium salts, and salts with organic bases:

(a) 3-amino-3-azabicyclo[3,2,0]heptane of Formula II,

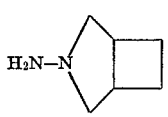

is reacted with a compound of Formula III,

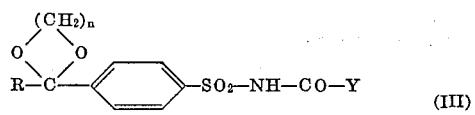

in which R and $n$ have the above significance, and Y signifies an alkoxy radical having from 1 to 4 carbon atoms or an amino radical, and, when an alkali metal, alkaline earth metal or ammonium salt or a salt with an organic base is required, salification is effected.

(b) A compound of Formula IV,

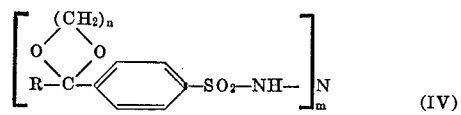

in which R and $n$ have the above significance, and M signifies the cation of an alkali or alkaline earth metal, and $m$ corresponds to the valency of M, is reacted with a compound of Formula V,

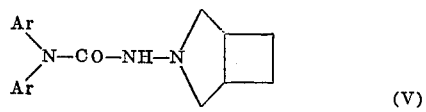

in which the two symbols Ar signify identical or different aromatic radicals which may optionally be substituted and which may be joined together by a single bond, a methylene or ethylene radical or an oxygen or sulphur atom, or with a carbodihydrazide of Formula VI,

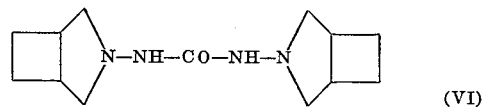

or with a compound of Formula VII,

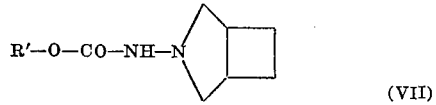

in which R' signifies an alkyl radical having 1 to 4 carbon atoms, when the free base is desired, the resulting compound I is liberated from its alkali metal or alkaline earth metal salt, and, when an alkali metal, alkaline earth metal or ammonium salt or a salt with an organic base is required, salification is effected.

(c) A compound of Formula XI,

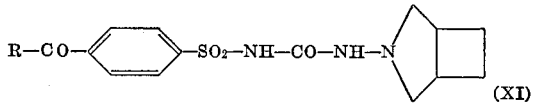

in which R has the above significance, is ketalized with ethylene glycol or 1,3-propanediol, in the presence of an acid reacting catalyst, and, when an alkali metal, alkaline earth metal or ammonium salt or a salt with an organic base is required, salification is effected.

Suitable starting materials of Formula III are the lower alkyl esters, preferably the methyl or ethyl ester, of the substituted benzenesulphonyl-carbamic acids or their amides (i.e. benzenesulphonylureas).

The process (a) may, for example, be effected as follows depending on the starting materials used:

A compound of Formula II dissolved in an anhydrous, organic solvent, e.g. absolute benzene, toluene, xylene, dimethyl formamide or acetonitrile, is added to a solution of a benzenesulphonyl-carbamic acid ester of Formula III, e.g. 4-(2-methyl-1,3-dioxolan-2-yl)benzenesulphonyl-carbamic acid ethyl ester, in more of the same solvent. The reaction mixture is heated to the boil at reflux for 1 to 6 hours, and is then cooled to room temperature. The liquid phase is removed by decantation, filtration or evaporation. The residue, which contains the crude final product, is obtained in pure form by crystallization from a suitable solvent.

The reaction of compound II with a benzenesulphonyl-carbamic acid ester of Formula III may likewise be effected without solvent, e.g. by melting.

When benzenesulphonyl-urea derivatives are used as starting materials of Formula III the process is advantageously effected by heating a mixture of the benzenesulphonyl-urea derivative and the compound of Formula II, or a salt thereof, e.g. the hydrochloride, in a suitable solvent, e.g. ethyl acetate or acetonitrile, and, if the free base is used, also absolute benzene or 1,2-dimethoxyethane, to the boiling temperature of the solvent for 5 to 24 hours, optionally in a stream of nitrogen. After cooling the final product is isolated and purified in manner known per se.

In accordance with the process (b), equimolar quantities of an alkali metal or alkaline earth metal salt, preferably the sodium salt, of the substituted benzenesulphonamide, of Formula IV and a semicarbazide of Formula V, e.g. 1 - (3-azabicyclo[3,2,0]hept-3-yl)-3,3-diphenyl-urea, are dissolved in a solvent, e.g. dimethyl formamide, and heated to approximately 100° C. in an oil bath. An excess amount of the semicarbazide may, however, also be used. The resulting alkali metal or alkaline earth metal salt of the compound I usually already crystallizes upon cooling and after isolation may be converted into the compound I by acidification. When no crystallization occurs, the solvent may, for example be reduced to half its volume in a vacuum and water and some alkali added to the residue. The secondary amine which results as by-product may then be removed by extraction with ether or a chlorinated hydrocarbon, e.g. chloroform, and after acidification (e.g. with acetic acid) the desired sulphonyl-semicarbazide may be obtained in pure form. If necessary, the resulting compound may be purified by dissolving in dilute ammonia and precipitating with dilute hydrochloric acid.

When a symmetric carbodihydrazide of Formula VI is used as starting material the process (b) is effected in that equimolar amounts of an alkali metal or alkaline earth metal salt, preferbly the sodium salt, of the correspondingly substituted benzenesulphonamide of Formula IV and 1,3-bis(3-azabicyclo[3,2,0]hept-3-yl)-urea are heated in an open flask. The preferred reaction temperature is between 150° and 200° C. In most cases the resulting melted material already solidifies after a few minutes with the formation of the alkali metal or alkaline earth metal salt of the benzenesulphonyl-semicarbazide, which is converted into the corresponding free compound by dissolving in water and acidifying.

The reaction of the alkali metal or alkaline earth metal salt of the sulphonamide with the carbodihydrazide may, however, also be effected by heating a solution of the two components in a suitable high-boiling solvent (approximately 190° C.), e.g. diethyl-acetamide, at reflux for 10 to 60 minutes. After cooling, the desired compound may be liberated from the alkali metal or alkaline earth metal salt by acidification and isolated and purified in manner known per se.

When a compound of Formula VII is used as starting material, the process (b) is effected by heating a solution of the alkali metal or alkaline earth metal salt of the sulphonamide of Formula IV and the carbazate of Formula VII in a suitable organic solvent, e.g. dimethyl formamide, dimethyl- or diethyl-acetamide, at a temperature of 40–160° for 5 to 36 hours. The desired compound I is isolated from the reaction mixture in a manner similar to that described above.

In accordance with the process (c), the ketalization of compounds of Formula XI is preferably effected by heating a mixture of the compound of Formula XI and ethylene glycol or 1,3-propanediol to about 65–90° whilst stirring, with the addition of orthoformic acid trimethyl or triethyl ester and in the presence of an acid reacting catalyst, e.g. p-toluenesulphonic acid, boron trifluoride etherate and potassium hydrogen sulphate, whereby the volatile portions are simultaneously removed by distillation. After heating the reaction mixture to about 130° for a further 1 to 2 hours, the desired final product is isolated from the reaction mixture and purified in manner known per se.

The compounds of Formula I have valuable pharmacodynamic properties. Thus, in tests effected with animals (rats, dogs) they exhibit a pronounced blood sugar lowering effect, which occurs even upon administration of low doses. 1-(3-azabicyclo[3,2,0]hept-3-yl)-3-[4-(2-methyl-1-3-dioxolan-3-yl)benzenesulphonyl]urea is especially useful in this respect. When administered in low doses, the compounds furthermore lower the content of free fatty acids in the blood. The compounds are well tolerated and have a low toxicity in comparison with their effectiveness.

The compounds of the invention are therefore indicated for use in the treatment of diabetes mellitus and disorders in lipid metabolism, in which case they are preferably administered orally in a daily dose of 50 to 1000 mg.

In order to produce suitable medicinal preparations the compounds are worked up with the usual inorganic or organic adjuvants which are inert and physiologically acceptable. Suitable medicinal preparations are for example, tablets, dragés, capsules, syrups, injectable solutions. Aside from adjuvants, e.g. polyvinyl pyrrolidone, methyl cellulose, talcum, magnesium stearate, stearic acid and sorbic acid, the preparations may contain suitable preserving agents, sweetening and colouring substances and flavourings.

EXAMPLE OF A GALENICAL PREPARATION

Tablets

| | G. |
|---|---|
| 1 - (3 - azabicyclo[3,2,0]hept-3-yl) - 3 - [4-(2-methyl - 1-3-dioxolan-2-yl)benzenesulphonyl] urea | 0.100 |
| Magnesium stearate | 0.0010 |
| Polyvinyl pyrrolidone | 0.0040 |
| Talcum | 0.0050 |
| Maize starch | 0.010 |
| Lactose | 0.038 |
| Dimethyl silicone oil | 0.0005 |
| Polyethylene glycol 6000 | 0.0015 |
| For a tablet of | 0.160 |

The 3-amino-3-azabicyclo[3,2,0]heptane of Formula II used as starting material is new and together with the process for its production forms part of the present invention. It may be produced by reacting 3-azabicyclo[3,2,0]heptane with sodium nitrite in aqueous mineral acid solution, e.g. in aqueous sulphuric acid solution, in the cold, in manner known per se, isolating the nitroso compound from the reaction mixture and purifying it by crystallization and subsequently reducing the nitroso compound. The reduction of the nitroso radical to the amino radical may be effected with zinc in glacial acetic acid or formic acid, optionally in the presence of a catalytical amount of a mercury-II-salt, e.g. mercury-II-chloride, with lithium aluminium hydride in diethyl ether or tetrahydrofuran or with sodium amalgam in water or ethanol in manner known per se.

The benzenesulphonyl-carbamic acid and benzenesulphonylurea derivatives of Formula III used as starting materials are also new. They may be obtained from the benzenesulphonamides of Formula VIII

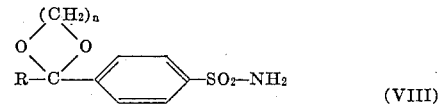

(VIII)

in which R and $n$ have the above significance, which are also new and the production of which is described below.

The sulphonyl-carbamic acid esters, of Formula III (Y=alkoxy), e.g. 4-(2-methyl-1,3-dioxolan-2-yl)benzenesulphonyl-carbamic acid ethyl ester, are obtained in that the corresponding benzenesulphonamide of Formula VIII is treated with chloroformic acid ethyl ester in a suitable organic solvent, e.g. acetone, at 40–70° C. for 5 to 18 hours, in the presence of an alkaline condensation agent, e.g. sodium or potassium carbonate. The compound which precipitates from the cooled reaction mixture is subsequently dissolved in water and the aqueous solution is weakly acidified with a mineral acid, e.g. dilute hydrochloric acid, whereupon the desired benzenesulphonyl-carbamic acid ester precipitates and is isolated by filtration and subsequently purified, e.g. by crystallization.

The benzenesulphonyl-ureas (Formula III, Y=amino) may be obtained as follows:

The corresponding sulphonamide of Formula VIII is heated for 4 to 6 hours with an alkali metal cyanate in aqueous alcoholic solution, the precipitated alkali metal salt is subsequently filtered off from the cooled reaction mixture, is dissolved in a small amount of water, the aqueous solution is weakly acidified with a dilute mineral acid, e.g. dilute hydrochloric acid, and the benzenesulphonyl-urea derivative is isolated therefrom in manner known per se.

The benzenesulfonpyl-ureas may also be obtained by heating an alkali metal or alkaline earth metal salt of the corresponding sulphonamide (compounds of Formula IV) and urea in a high-boiling solvent, e.g. benzyl alcohol, to 120–180° C. The desired urea compound precipitates by acidifying the cooled reaction solution.

The benzenesulphonamides of Formula VIII, in which R and n have the above significance, may be obtained by heating a solution of a lower 4-acylbenzenesulphonamide of Formula IX

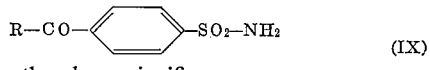

(IX)

in which R has the above significance, e.g. 4-acetyl- or 4-propionyl-benzenesulphonamide, in ethylene glycol or 1,3-propanediol to approximately 65–90° C. whilst stirring, with the addition of orthoformic acid trimethyl or triethyl ester in the presence of an acid reacting catalyst, e.g. p-toluenesulphonic acid, boron trifluoride etherate or potassium hydrogen sulphate, whereby the volatile portions are simultaneously removed by distillation. After heating the reaction mixture to approximately 130° whilst stirring for a further 1 to 2 hours, the desired benzenesulphonamide is isolated from the reaction mixture and purified in manner known per se.

The compounds of Formula V used as starting materials are also new, and together with the process for their production, also form part of the present invention. They may be obtained from the corresponding carbamoyl halides of Formula X

(X)

in which Ar has the above significance, and Hal signifies a chlorine or bromine atom, and the compound of Formula II. The two compounds are, for example, heated in a water bath for one hour in aqueous alcoholic solution or in an organic solvent, e.g. 1,2-dimethoxy-ethane or dimethyl formamide, in the presence of an acid binding agent, e.g. sodium or potassium carbonate or bicarbonate, or an additional equivalent of the compound II, or the solution is stirred at room temperature for several hours. The desired semicarbazides may be isolated and purified in manner known per se.

The compounds VI and VII are also new, and together with the process for their production also form part of the present invention. They may, for example, be produced as follows: The compound of Formula II is reacted with a chloroformic acid ester at room temperature in an inert organic solvent, e.g. 1,2-dimethoxyethane, in the presence of an acid binding agent, e.g. a second mol of compound II or one mol of potassium carbonate, to yield the corresponding compound of Formula VII, which is then reacted with a further mol of compound II by melting the reactants at approximately 150° C. or by heating in boiling xylene for 24 to 72 hours to yield the desired compound of Formula VI.

The compounds of Formula XI used as starting materials are also new and together with the process for their production, also form part of the present invention. They may be produced by reacting an alkali metal or alkaline earth metal salt of a sulphonamide of Formula IX with a compound of Formula V, VI or VII. The reaction conditions are the same as those indicated above for the reaction of compounds of Formula IV with compounds of Formula V, VI or VII.

The term "in manner known per se" as used herein designates methods in use or described in the literature on the subject.

In the following non-limitative examples all temperatures are indicated in degrees centigrade. The melting points are uncorrected.

Example 1.—1-(3-azabicyclo[3,2,0]hept-3-yl)-3-[4-(2-methyl-1,3-dioxolan-2-yl)benzenesulphonyl]urea 3.0 g. of 3-amino-3-azabicyclo[3,2,0]heptane and 8.2 g. of 4-(2-methyl-1,3-dioxolan-2-yl)benzene-sulphonyl-carbamic acid ethyl ester are heated to the boil at reflux in 200 ml. of benzene for 5 hours. After cooling, the reaction product which crystallizes is filtered off and washed with benzene and petroleum ether. The compound indicated in the heading has a melting point of 190°.

The 4 - (2 - methyl - 1,3 - dioxolan - 2 - yl)benzenesulphonyl-carbamic acid ethyl ester used as starting material is produced as follows:

(a) 2 - methyl - 2 - (4 - sulphonamidophenyl) - 1,3 - dioxolane.—A solution of 100 g. of 4-acetyl-benzenesulphonic acid amide, 112 g. of ethylene glycol, 178.2 g. of orthoformic acid triethyl ester and 2.5 g. of p-toluenesulphonic acid is heated to 90° in an oil bath whilst stirring for one hour, whereby the ethanol is simultaneously removed by distillation. After stirring at an oil bath temperature of 130° for a further 1½ hours, the reaction solution is concentrated in a vacuum and the resulting mashy residue is recrystallized from ethylene chloride. 4-(2-methyl-1,3-dioxolan-2-yl)benzenesulphonamide has a melting point of 126–128°.

(b) 4 - (2 - methyl - 1,3 - dioxolan - 2 - yl)benzenesulphonyl-carbamic acid ethyl ester.—119 g. of chloroformic acid ethyl ester are added dropwise at room temperature to a suspension of 178.3 g. of 2-methyl-2-(4-sulphonamidophenyl)-1,3-dioxolane and 278 g. of potassium carbonate in 3.1 litres of dry acetone whilst stirring for 1 hour and 45 minutes and the mixture is then heated to the boil at reflux whilst stirring for 18 hours. The cooled reaction product is subsequently filtered, the filter residue is dissolved in ice water, the solution is acidified with 270 ml. of concentrated hydrochloric acid whilst stirring and extraction is effected with 900 ml. of chloroform. The chloroform extract is washed twice, each time with 150 ml. of water, is dried over sodium sulphate and filtered. After concentrating the filtrate, the resulting semi-crystalline material is recrystallized from carbon tetrachloride. 4 - (2 - methyl - 1,3 - dioxolan - 2 - yl)benzenesulphonyl-carbamic acid ethyl ester has a melting point of 88–90°.

The 3-amino-3-azabicyclo[3,2,0]heptane used as starting material is produced as follows:

(a) 3-nitroso-3-azabicyclo[3,2,0]heptane.—33 g. of 3-azabicyclo[3,2,0]heptane are dissolved in a mixture of 100 ml. of water and 33 g. of concentrated sulphuric acid and reacted at 0 to −5° with a solution of 118 g. of sodium nitrite in 200 ml. of water for 2 hours. The aqueous solution is then extracted five times, each time with 100 ml. of ether. The combined ether extracts are dried with sodium sulphate and concentrated by evaporation. The residue is distilled in a vacuum. 3-nitroso-3-azabicyclo[3,2,0]heptane has a boiling point of 70° at 0.1 mm. of Hg.

(b) 3-amino-3-azabicyclo[3,2,0]heptane. — A solution of 35 g. of 3-nitroso-3-azabicyclo[3,2,0]heptane in 200 ml. of ether is added dropwise whilst cooling and stirring to a suspension of 21.0 g. of lithium aluminium hydride in 2 litres of ether. After the addition has been completed, heating at reflux is effected for 16 hours. Cooling is subsequently effected and the excess lithium aluminium hydride is decomposed by the careful addition of water. The inorganic precipitate is filtered off, washing is effected with ether, the combined ether solutions are dried over sodium sulphate and concentrated by evaporation. The residue is distilled in a vacuum. 3-amino-3-azabicyclo[3,2,0]heptane has a boiling point of 56° at 12 mm. of Hg.

Example 2.—1-(3-azabicyclo[3,2,0]hept-3-yl-3-[4-(2-methyl-1,3-dioxan-2-yl)benzenesulphonyl]urea 15.0 g. of 4-(2-methyl-1,3-dioxan-2-yl)benzenesulphonyl-urea and 5.6 g. of 3-amino-3-azabicyclo[3,2,0]heptane are heated at reflux for 17 hours in 100 ml. of ethyl acetate. The resulting solution is concentrated to half its volume and upon cooling the reaction product crystallizes. The compound indicated in the heading has a melting point of 170–172°.

The 4 - (2 - methyl - 1,3 - dioxan - 2 - yl)benzenesulphonyl-urea used as starting material may be produced as follows:

(a) 4 - (2 - methyl - 1,3 - dioxan - 2 - yl)benzenesulphonamide.—A solution of 19.9 g. of 4-acetyl-benzenesulphonamide, 23.1 g. of 1,3-propanediol, 35.6 g. of orthoformic acid triethyl ester and 0.5 g. of p-toluenesulphonic acid is heated to 90° in an oil bath whilst stirring for one hour, whereby the portions which distil at this temperature are simultaneously removed. After stirring at an oil bath temperature of 130° for a further 1½ hours, the reaction solution is concentrated in a vacuum and the resulting oil crystallized from ethylene chloride. 4-(2-methyl-1,3-dioxan-2-yl)benzenesulphonamide has a melting point of 175–177° (decomposition).

(b) 4 - (2 - methyl-1,3-dioxan-2-yl)benzenesulphonyl-urea.—257.0 g. of 4-(2-methyl-1,3-dioxan-2-yl)benzenesulphonamide and 113.4 g. of potassium cyanate are heated at reflux at a bath temperature of 110° in 1 litre of absolute ethanol whilst stirring for 7½ hours. The thick mash is cooled and the solid material filtered off. The dried residue, i.e. the potassium salt of the urea, is dissolved in 1.5 litres of ice water and weakly acidified (pH 4–5) by adding 200 ml. of dilute hydrochloric acid (1:1) whilst stirring, cooling externally with ice and adding ice to the solution. The precipitated product is filtered off, washed portionwise with 1 litre of water and the moist product is dissolved in 3 litres of ethyl acetate. The weakly acid water portion is separated, the ethyl acetate solution is washed in 3 portions with a total of 600 ml. of water, is dried over sodium sulphate and concentrated in a vacuum to a crystalline residue. The crude product is recrystallized from acetonitrile, whereby the analytically pure 4-(2-methyl-1,3-dioxan-2-yl)benzenesulphonyl-urea having a melting point of 170–172° (decomposition), is obtained.

Example 3.—1-(3-azabicyclo[3,2,0]hept-3-yl)-3-[4-(2-n-propyl-1,3-dioxolan-2-yl)benzenesulphonyl]urea This compound is obtained from 9.3 g. of 4-(2-n-propyl-1,3-dioxolan-2-yl)benzenesulphonyl-urea and 3.3 g. of 3-amino-3-azabzicyclo[3,2,0]heptane in a manner analogous to that described in Example 2. The compound indicated in the heading has a melting point of 144–145° (isopropanol).

The 4-(2-n-propyl-1,3-dioxolan-2-yl)benzenesulphonyl-urea used as starting material may be produced as follows:

(a) 4-(2-n-propyl - 1,3-dioxolan-2-yl)benzenesulphonamide.—A solution of 34.1 g. of 4-(n-butyryl)benzenesulphonamide, 18.6 g. of ethylene glycol, 26.7 g. of orthoformic acid triethylester and 0.15 g. of p-toluenesulphonic acid is heated to 90° in an oil bath whilst stirring for 2 hours, whereby the portions which distil at this temperature are simultaneously removed. The reaction solution is concentrated in a vacuum and the resulting oil crystallized from isopropano/petroleum ether (1:1). After recrystallizing once from carbon tetrachloride, the analytically pure 4-(2-n-propyl-1,3-dioxolan-2-yl)benzenesulphonamide having a melting point of 84–86° (decomposition), is obtained.

(b) 4-(2-n-propyl-1,3-dioxolan - 2 - yl)benzenesulphonyl-urea.—A suspension of 27.1 g. of 4-(2-n-propyl-1,3-dioxolan-2-yl)benzenesulphonamide and 11.3 g. of potassium cyanate in 100 ml. of absolute ethanol is heated at reflux at a bath temperature of 110° whilst stirring for 21 hours. The thick mash is cooled and the solid material filtered off. The dried residue, i.e. the potassium salt of the desired sulphonyl-urea, is dissolved in 250 ml. of water and is acidified with 50 ml. of 10% hydrochloric acid whilst stirring, cooling externally with ice and adding ice to the solution. The precipitated product is filtered off, washed portionwise with 200 ml. of water and the moist product is recrystallized from 140 ml. of absolute ethanol, whereby the analytically pure 4-(2-n-propyl-1,3-dioxolan-2-yl)benzenesulphonyl-urea having a melting point of 175–177° (decomposition), is obtained.

Example 4.—1-(3-azabicyclo[3,2,0]hept-3-yl)-3-4-(2-methyl-1,3-dioxolan-2-yl)benzenesulphonyl]urea 13.3 g. of the sodium salt of 4-(2-methyl-1,3-dioxolan-2-yl)benzenesulphonamide and 15.3 g. of 1,1-diphenyl-3-(3-azabicyclo[3,2,0]hept-3-yl)urea are heated to 100–105° for one hour in 200 ml. of dimethyl formamide. The mixture is subsequently concentrated in a vacuum and the residue treated with 400 ml of water. Filtration is effected, the filtrate is extracted with 100 ml. of chloroform and acidified to pH 4–5 with 2 N hydrochloric acid, whereby the reaction product precipitates. Filtration, drying and recrystallization from benezene/petroleum ether are effected. The compound indicated in the heading has a melting point of 190°.

The 1,1-diphenyl-3-(3-azabicyclo[3,2,0]hept-3-yl) urea used as starting material is produced as follows:

5.6 g. of 3-amino-3-azabicyclo[3,2,0]heptane are added at 25° whilst stirring to 11.6 g. of diphenylcarbamoyl chloride and 5.5 g. of triethylamine in 200 ml. of 1,2-dimethoxy-ethane. After stirring at room temperature for 5 hours, filtration is effected and the residue is washed thrice, each time with 50 ml. of ether. The combined filtrates are concentrated by evaporation in a vacuum and the resulting compound is recrystallized from ethanol. Melting point 145–146°.

Example 5.—1-(3-azabicyclo[3,2,0]hept-3-yl)-3-[4-(2-methyl-1,3-dioxan-2-yl)benzenesulphonyl]urea 14.0 g. of the sodium salt of 4-(2-methyl-1,3-dioxan-2-yl)benzenesulphonamide and 9.2 g. of N-(3-azabicyclo[3,2,0]hept-3-yl)carbamic acid ethyl ester are heated to 100° in 200 ml. of N,N-diethyl-acetamide for 30 hours. After cooling, 150 ml. of ether are added to the reaction solution, filtration is effected and the filtrate placed in a refrigerator. After 3 days the precipitated crystalline material is filtered off and dissolved in 100 ml. of water. Filtration is effected and the aqueous solution is acidified to pH 4–5 with glacial acetic acid. The precipitated crude product is filtered off, dried and recrystallized from ethyl acetate/petroleum ether. The compound indicated in the heading has a melting point of 170–172°.

The N - (3-azabicyclo[3,2,0]hept-3-yl)carbamic acid ethyl ester used as starting material is produced as follows:

12.6 g. of 3-amino-3-azabicyclo[3,2,0]heptane and 11.1 g. of triethylamine are added dropwise to a solution of 10.8 g. of chloroformic acid ethyl ester in 200 ml. of 1,2-dimethoxy-ethane whilst stirring. The mixture is subsequently stirred at 80° for 5 hours, filtration is effected, the filtrate is concentrated by evaporation in a vacuum and the residue is recrystallized from light benzene (boiling range 80–110°). The compound has a melting point of 80–82°.

Example 6.—1-(3-azabicyclo[3,2,0]hept-3-yl)-3-[4-(2-methyl-1,3-dioxolan-2-yl)benzenesulphonyl]urea (A) 13.3 g. of the sodium salt of 4-(2-methyl-1,3-dioxolan-2-yl)benzenesulphonamide and 12.5 g. of 1,3-bis-(3-azabicyclo[3,2,0]hept-3-yl)urea are triturated together and then heated to 170° for 10 minutes. After cooling, the mixture is dissolved in 50 ml. of water, filtration is effected and the pH value of the filtrate is adjusted to 4–5 with 2 N hydrochloric acid. The precipitated crude product is filtered off, washed with water, dried and recrystallized from benzene/petroleum ether. The compound indicated in the heading has a melting point of 190°.

(B) It is also possible to heat the two starting materials (quantities the same as those indicated in A) at reflux in 200 ml. of N,N-diethyl-acetamide whilst stirring for 45 minutes. After cooling, 150 ml. of ether are added to the reaction solution, filtration is effected and the filtrate is placed in a refrigerator. After 3 days the precipitated crystalline material is filtered off and dissolved in 100 ml. of water. Filtration is effected and the aqueous solution is acidified to pH 4–5 with glacial acetic acid. The precipitated crude product is isolated and purified as indicated in section (A). The compound indicated in the heading has a melting point of 190°.

The 1,3-bis(3-azabicyclo[3,2,0]hept-3-yl)urea used as starting material is obtained as follows:

9.2 g. of N-(3-azabicyclo[3,2,0]hept-3-yl)carbamic acid ethyl ester and 6.1 g. of 3-amino-3-azabicyclo[3,2,0]heptane are heated at reflux in 100 ml. of xylene for 100 hours. Concentration in a vacuum is subsequently effected and the residue is recrystallized from light benzine (boiling point 80–110°). The 1,3-bis(3-azabicyclo[3,2,0]hept-3-yl)urea has a melting point of 145–147°.

Example 7.—1-(3-azabicyclo[3,2,0]hept-3-yl)-3-[4-(2-methyl-1,3-dioxan-2-yl)benzenesulphonyl]urea A solution of 1.1 g. of 1-(3-azabicyclo[3,2,0]hept-3-yl)-3-(4-acetylbenzenesulphonyl)urea, 5.3 g. of 1.3-propanediol, 5.9 g. of ortho-formic acid triethyl ester and 0.03 g. of p-toluenesulfonic acid, which results upon heating the reaction mixture, is heated in an oil bath to 90° whilst stirring for 1½ hours, whereby the portions which distil at this temperature are simultaneously removed.

The reaction solution is subsequently concentrated in a vacuum and the resulting oil is crystallized from ethyl acetate. The compound indicated in the heading has a melting point of 170–172°.

The 1-(3-azabicyclo[3,2,0]hept-3-yl)-3-(4-acetylbenzenesulphonyl)urea used as starting material is produced as follows:

8.7 g. of the sodium salt of 4-acetylbenzenesulphonamide and 12.1 g. of 1,1-diphenyl-3-(3-azabicyclo[3,2,0]hept-3-yl)urea are heated at a bath temperature of 110° in 50 ml. of dimethyl formamide for one hour. The resulting reaction solution is concentrated in a vacuum and the residue divided between 150 ml. of water and 200 ml. of ether. The pH value of the separated water portion is adjusted to 4–5 by the addition of 2 N hydrochloric acid, whereby the reaction product precipitates in crystalline form. 1-(3-azabicyclo[3,2,0]hept-3-yl)-3-(4-acetylbenzenesulphonyl)urea has a melting point of 188–190° (decomposition).

What is claimed is:
1. A compound selected from the group consisting of a compound of formula:

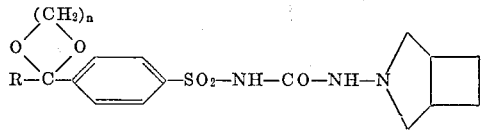

in which R is alkyl of 1 to 3 carbon atoms and $n$ is 2 or 3, and a pharmaceutically acceptable alkali metal, alkaline earth metal or ammonium salt.

2. A compound according to claim 1, in which the compound is 1-(3-azabicyclo[3,2,0]hept-3-yl)-3-[4-(2-methyl-1,3-dioxolan-2-yl)benzenesulphonyl]urea.

3. A compound according to claim 1, in which the compound is 1-(3-azabicyclo[3,2,0]hept-3-yl)-3-[4-(2-methyl-1,3-dioxan-2-yl)benzenesulphonyl]urea.

4. A compound according to claim 1, in which the compound is 1-(3-azabicyclo[3,2,0]hept-3-yl)-3-[4-(2-n-propyl-1,3-dioxolan-2-yl)benzenesulphonyl]urea.

References Cited
UNITED STATES PATENTS 3,438,976  4/1969  Tucker et al. _____ 260—239.6

ALEX MAZEL, Primary Examiner

J. A. NARCAVAGE, Assistant Examiner

U.S. Cl. X.R.

260—340.7, 340.9, 326.85; 424—274